United States Patent [19]

Ukai et al.

[11] Patent Number: 5,321,535
[45] Date of Patent: Jun. 14, 1994

[54] LIQUID CRYSTAL DISPLAY DEVICE WITH CONTROL CAPACITORS FOR GRAY SCALE

[75] Inventors: Yasuhiro Ukai, Kobe; Tomihisa Sunata, Miki; Toshiya Inada, Kobe, all of Japan

[73] Assignee: Hosiden Corporation, Osaka, Japan

[21] Appl. No.: 67,975

[22] Filed: May 27, 1993.

Related U.S. Application Data

[62] Division of Ser. No. 733,177, Jul. 19, 1991, Pat. No. 5,245,450.

[30] Foreign Application Priority Data

Jul. 23, 1990 [JP] Japan .................... 2-194632

[51] Int. Cl.⁵ .......... G02F 1/133; G09G 3/36
[52] U.S. Cl. ........................ 359/55; 359/59; 359/79; 359/87; 345/89
[58] Field of Search ............ 359/54, 55, 57, 59, 359/79, 87; 345/87, 89, 92, 152

[56] References Cited

U.S. PATENT DOCUMENTS

| | | | |
|---|---|---|---|
| 4,840,460 | 6/1989 | Bernot et al. | 359/59 |
| 5,124,695 | 6/1992 | Green | 359/87 |
| 5,126,865 | 6/1992 | Sarma | 359/59 |
| 5,191,452 | 3/1993 | Sarma | 359/59 |

FOREIGN PATENT DOCUMENTS

| | | | |
|---|---|---|---|
| 0289071 | 11/1988 | European Pat. Off. | |
| 0369621 | 5/1990 | European Pat. Off. | |
| 63-316025 | 12/1988 | Japan | |
| 0042635 | 2/1989 | Japan | 359/59 |
| 2217088 | 10/1989 | United Kingdom | |

OTHER PUBLICATIONS

"Thin Film Transistor For Gray Scale LCD" IBM-Technical Disclosure Bulletin—vol. 33–No. 1A–Jun. 1990-pp.481–482.
Sarma et al "Active Matriz LCD Using Gray-Scale in Halftone Methods" SID 89 Digest-May 1989-pp. 148–150.
Patent Abstracts of Japan-vol. 13–No. 157 (P857)–Apr. 1989-JP A 63-316025.
Patent Abstracts of Japan-vol. 9–No. 129 (P361) (1852)–Jun. 1985-JP A 60-014219.

Primary Examiner—William L. Sikes
Assistant Examiner—Tai V. Duong
Attorney, Agent, or Firm—Pollock, VandeSande and Priddy

[57] ABSTRACT

Each pixel electrode of a liquid crystal display device is divided into a plurality of subpixel electrodes, which are separated by a gap from each other, and a control capacitor electrode is provided opposite at least one of the subpixel electrodes through a first insulating film. The control capacitor electrode has a region extending the entire length of the gap so that a drive voltage can be applied to liquid crystal in the gap. The control capacitor electrode forms a control capacitor connected in series with a liquid crystal capacitor formed by the at least one subpixel electrode between it and a common electrode corresponding thereto. An additional capacitor electrode, which is opposite the at least one subpixel electrode through a second insulating film, is formed, by which is formed an additional capacitor equivalently in parallel to the liquid crystal capacitor.

1 Claim, 12 Drawing Sheets

LIQUID CRYSTAL DISPLAY DEVICE WITH CONTROL CAPACITORS FOR GRAY SCALE

This is a divisional of application U.S. Ser. No. 07/733,177 filed on Jul. 19, 1991, now U.S. Pat. No. 5,245,450.

BACKGROUND OF THE INVENTION

The present invention relates to a pixel structure for a liquid crystal display device which employs pixels each composed of a plurality of subpixels and permits a multi-gradation display. More particularly, the invention concerns a pixel structure which provides for improved multi-gradation display quality and aperture ratio.

Figure 1A:
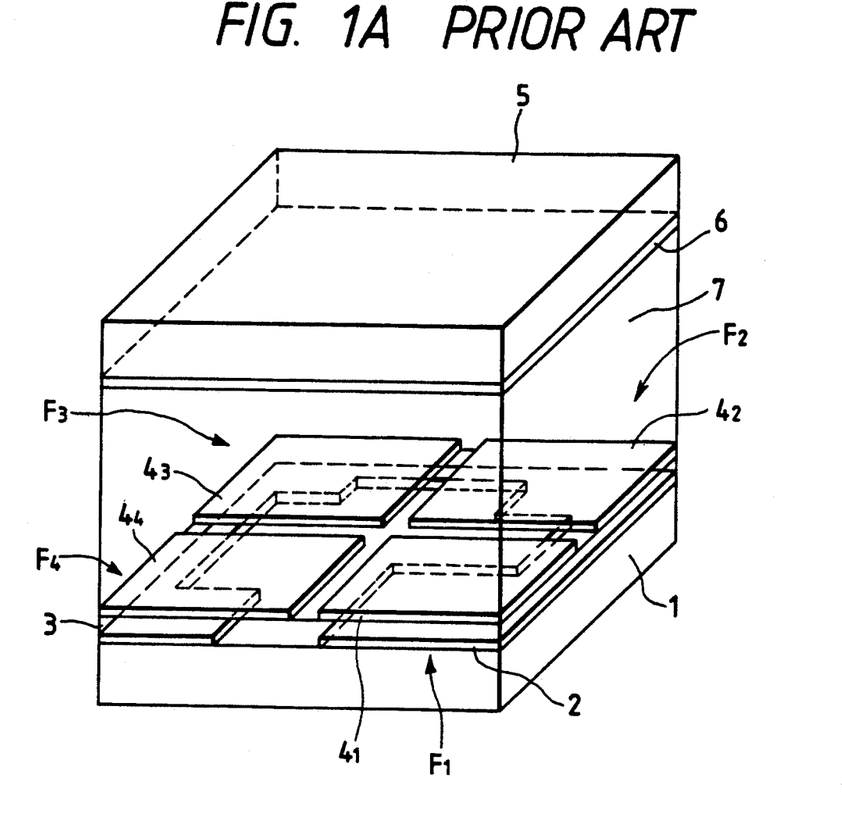
FIG. 1A is a perspective view showing a pixel structure of a conventional liquid crystal display device.
Figure 1B:
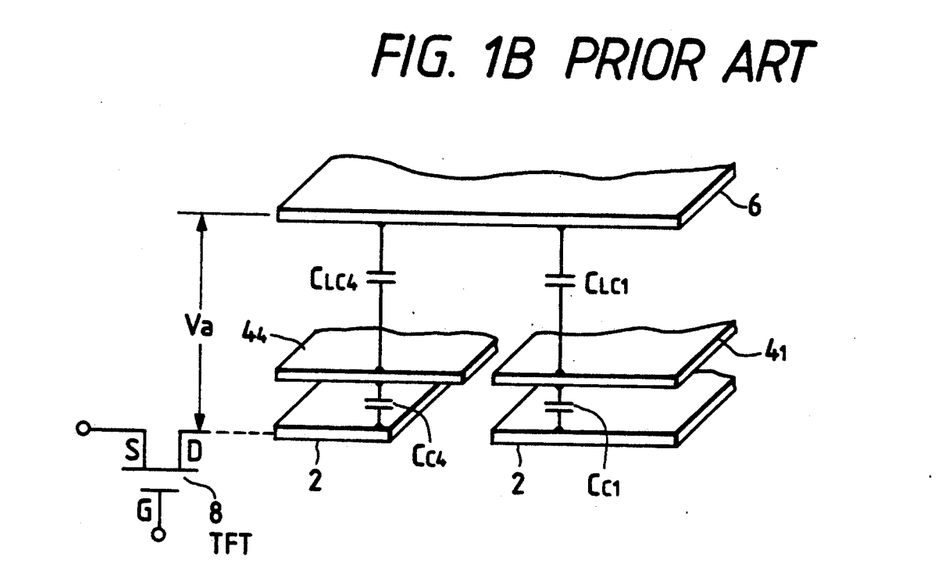
FIG. 1B is a diagram showing electrostatic capacitances formed between respective electrodes in FIG. 1A.
Figure 2:
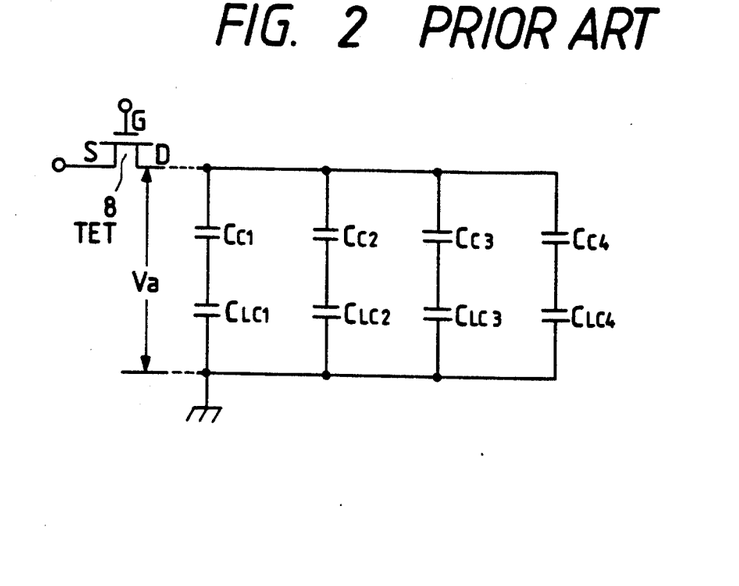
FIG. 2 is an electric equivalent circuit diagram of the pixel shown in FIG. 1A.

A prior art example of such a pixel structure is disclosed in U.S. Pat. No. 4,840,460. As depicted in FIG. 1A which is a perspective view showing one pixel region of a liquid crystal display panel cut out perpendicularly thereto, a control capacitor electrode 2 is formed on the interior surface of a transparent base plate 1 as of glass and an insulating film 3 is deposited over the entire area of the interior surface of the transparent base plate 1 including the control capacitor electrode 2. On the insulating film 3 there are formed four equally divided square subpixel electrodes $4_1$ to $4_4$. On the interior surface of a transparent base plate 5 as of glass, disposed in adjacent but spaced relation to the subpixel electrodes $4_1$ to $4_4$, there is deposited a common electrode 6 to define between it and the subpixel electrodes $4_i$ (where i=1 to 4) a space in which liquid crystal 7 is sealed. The control capacitor electrode 2, the subpixel electrodes $4_i$ and the common electrode 6 are transparent electrodes formed of ITO or similar material. Thus, one pixel is divided into four subpixels $F_1$ to $F_4$ corresponding to the subpixel electrodes $4_1$ to $4_4$, respectively. As shown in FIG. 1B, a control capacitor $C_{Ci}$ using the insulating film 3 as a dielectric is formed between each subpixel electrode $4_i$ and the control capacitor electrode 2, and a liquid crystal capacitor $C_{LCi}$ using the liquid crystal 7 as a dielectric is formed between the subpixel electrode $4_i$ and the common electrode 6. FIG. 2 shows an electric equivalent circuit of the pixel depicted in FIG. 1A. Letting electrostatic capacitances of the control capacitor $C_{Ci}$ and the liquid crystal capacitor $C_{LCi}$ be represented by $C_{Ci}$ and $C_{LCi}$ for convenience sake, the partial area of the control capacitor electrode 2 overlapping each subpixel electrode $4_i$ is so adjusted as to satisfy the following condition:

$$C_{C1} > C_{C2} > C_{C3} > C_{C4} \qquad (1)$$

The control capacitor electrode 2 is connected as shown in FIG. 1B to a drain electrode D of a thin film transistor (hereinafter referred to as a TFT) 8 formed on the transparent base plate 1 adjacent the pixel in FIG. 1A. A predetermined voltage Va is applied across the control capacitor electrode 2 and the common electrode 6 via the TFT 8. When the TFT 8 is turned ON, the applied voltage Va is divided, for each subpixel $F_i$, into a voltage $V_{Ci}$ across the control capacitor $C_{Ci}$ and a voltage $V_{LCi}$ across the liquid crystal capacitor $C_{LCi}$. The voltage $V_{LCi}$ is expressed as follows:

$$V_{LCi} = \frac{C_{Ci}}{C_{LCi} + C_{Ci}} \cdot Va \qquad (2)$$

By setting the capacitance of each control capacitor $C_{Ci}$ to such a value as in Eq. (1), the voltage $V_{LCi}$ across each liquid crystal capacitor $C_{LCi}$ can be set to satisfy the following condition:

$$V_{LC1} > V_{LC2} > V_{LC3} > V_{LC4} \qquad (3)$$

Figure 3:
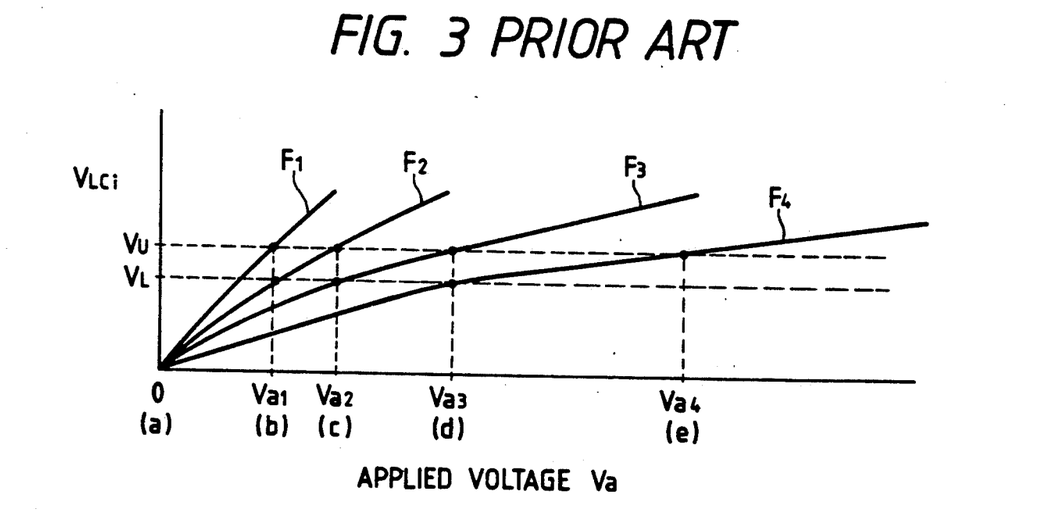
FIG. 3 is a graph showing an applied voltage Va vs. liquid crystal capacitor voltage $V_{LCi}$ characteristic in a subpixel electrode $F_i$ (where i=1 to 4) in FIGS. 1A and 1B.

Letting a voltage at which the transmission of light through the liquid crystal is saturated be represented by $V_U$ and a threshold voltage by $V_L$, the voltage $V_{LCi}$ across the liquid crystal Capacitor $C_{LCi}$ can assume the following cases according to the value of the voltage Va applied to the pixel, as shown in FIG. 3.
(a) $V_{LCi} = 0$ for Va=0.
(b) $V_{LC1} = V_U$ and $V_{LC2} = V_L$: In this case $V_{LC3}$ and $V_{LC4}$ are lower than $V_L$. The applied voltage Va in this instance is indicated by Va1.
(c) $V_{LC2} = V_U$ and $V_{LC3} = V_L$: The applied voltage Va in this instance is indicated by Va2.
(d) $V_{LC3} = V_U$ and $V_{LC4} = V_L$: The applied voltage in this instance is indicated by Va3.
(e) $V_{LC4} = V_U$: The applied voltage Va in this instance is indicated by Va4.

The applied voltage Vai is as follows:

$$Va1 > Va2 > Va3 > Va4 > 0 \qquad (4)$$

A multi-gradation display is produced by changing the value of the applied voltage Va.

In the prior art, the voltage $V_{LCi}$ across the liquid crystal capacitor $C_{LCi}$ is set so that when the applied voltage Va is Vai, the voltage $V_{LCi}$ becomes equal to the voltage $V_U$ at which the transmission of light through the liquid crystal becomes saturated. That is, $$V_{LCi} = \frac{C_{Ci}}{C_{LCi} + C_{Ci}} \cdot Vai = V_U \qquad (5)$$

The partial area of the control capacitor $C_{Ci}$ overlapping the subpixel electrode $4_i$ is selected so that its capacitance satisfies Eq. (5). As will be seen from Eq. (5), the reduction of the voltage to be applied to the liquid crystal capacitor $V_{LCi}$ of the subpixel electrode $4_i$ calls for a decrease in the capacitance of the corresponding control capacitor $C_{Ci}$. In other words, the partial area of the control capacitor electrode 2 overlapping the subpixel electrode $4_i$ must be decreased. However, as the overlapping area decreases (the overlapping area of the control capacitor $C_{C4}$ is the smallest in the above example), an error of the capacitance value $C_{Ci}$ increases owing to variations in the partial areas of the control capacitor electrode 2 overlapping the subpixel electrodes $4_1$ to $4_4$ which are caused by pattern misalignments. If the liquid crystal capacitor electrode voltage $V_{LCi}$ greatly deviates from the transmission saturating voltage $V_U$, an error in the multi-gradation display increases, seriously impairing the display quality.

Moreover, the adjoining subpixel electrodes $4_i$ of each pixel must be separated by certain gaps defined therebetween, but in the prior art, since the control capacitor electrode 2 is shaped so that it does not overlap most of such gaps, no voltage can be applied to the liquid crystal layer corresponding to the gaps not overlapping the control capacitor electrode 2—this reduces the effective pixel area and hence decreases the aperture ratio of the pixel.

Besides, since the subpixel electrodes $4_i$ are formed simply by dividing one pixel electrode in row and column directions, the center of an ON region of each pixel varies with the number of subpixels which are turned ON. Consequently, the quality of a display image is not good.

SUMMARY OF THE INVENTION

A first object of the present invention is to provide a liquid crystal display device which precludes the possibility of the reduction of the aperture ratio which is caused by the gap between adjacent subpixel electrodes.

A second object of the present invention is to provide a liquid crystal display device whose multi-gradation display quality undergoes no serious deterioration by scattering capacitances of individual control capacitors introduced during manufacture.

A third object of the present invention is to provide a liquid crystal display device in which the center of the ON region of each pixel remains unmoved regardless of an increase or decrease in the area of the ON region, providing for improved display image quality.

According to a first aspect of the present invention, in a liquid crystal display device of the type wherein a plurality of spaced-apart subpixel electrodes forming each pixel are disposed on a first base plate opposite a common electrode on a second base plate across liquid crystal sealed in the space defined between the first and second base plates to form a liquid crystal capacitor between each subpixel electrode and the common electrode, a control capacitor electrode opposed to at least one of the subpixel electrodes through an insulating film is provided between the first base plate and the subpixel electrode to form a control capacitor connected in series with the liquid crystal capacitor and a drive voltage is applied across the control capacitor electrode and the common electrode, the control capacitor electrode has a region extending over substantially the entire length of the gap between the adjoining subpixel electrodes and a region overlapping each subpixel electrode over a predetermined area.

According to a second aspect of the present invention, in a liquid crystal display device of the type wherein a plurality of spaced-apart subpixel electrodes forming each pixel are disposed on a first base plate opposite a common electrode on a second base plate across liquid crystal sealed in the space defined between the first and second base plates to form a liquid crystal capacitor between subpixel electrode and the common electrode, a control capacitor electrode opposed to at least one of the subpixel electrodes through a first insulating film is provided between the first base plate and the subpixel electrode to form a control capacitor connected in series with the liquid crystal capacitor and a drive voltage is applied across the control capacitor electrode and the common electrode, an additional capacitor electrode is formed opposite the abovementioned at least one subpixel electrode through a second insulating film to form an additional capacitor equivalently in parallel to the liquid crystal capacitor.

According to a third aspect of the present invention, in a liquid crystal display device of the type wherein a plurality of spaced-apart subpixel electrodes forming each pixel are disposed on a first base plate opposite a common electrode on a second base plate across liquid crystal sealed in the space defined between the first and second base plates to form a liquid crystal capacitor between each subpixel electrode and the common electrode, a control capacitor electrode opposed to at least one of the subpixel electrodes through a first insulating film is provided between the first base plate and the subpixel electrode to form a liquid crystal capacitor connected in series with the liquid crystal capacitor and a drive voltage is applied across the control capacitor electrode and the common electrode, the plurality of subpixel electrodes are formed so that they define a center subpixel region and at least one loop-like subpixel region surrounding it substantially concentrically therewith.

DESCRIPTION OF THE PREFERRED EMBODIMENTS

Figure 4A:
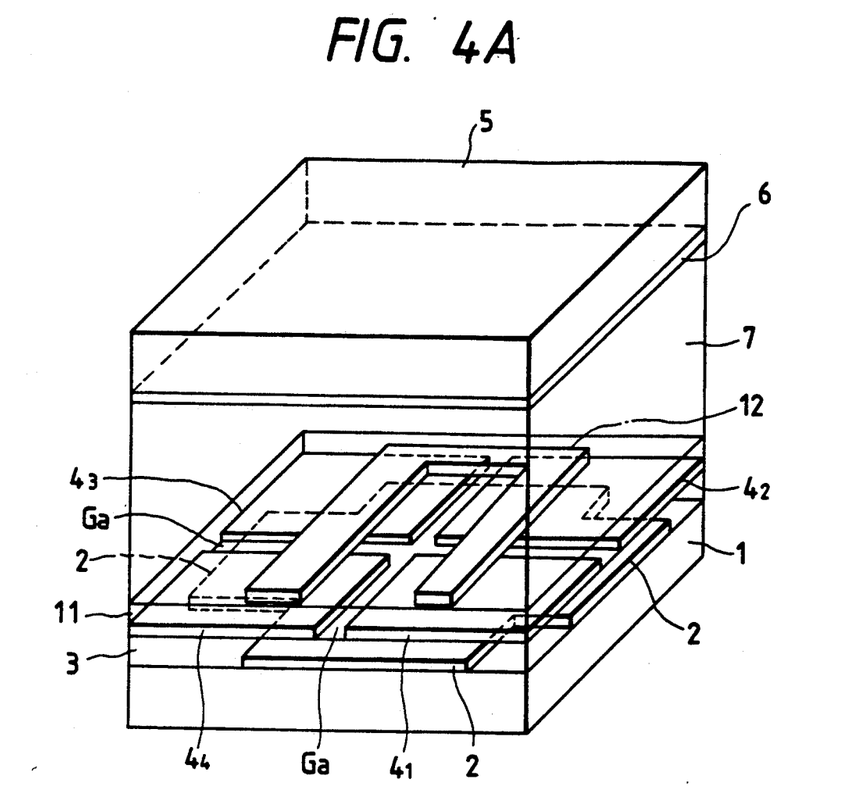
FIG. 4A is a perspective view showing a pixel structure according to the first and second aspects of the present invention.
Figure 4B:
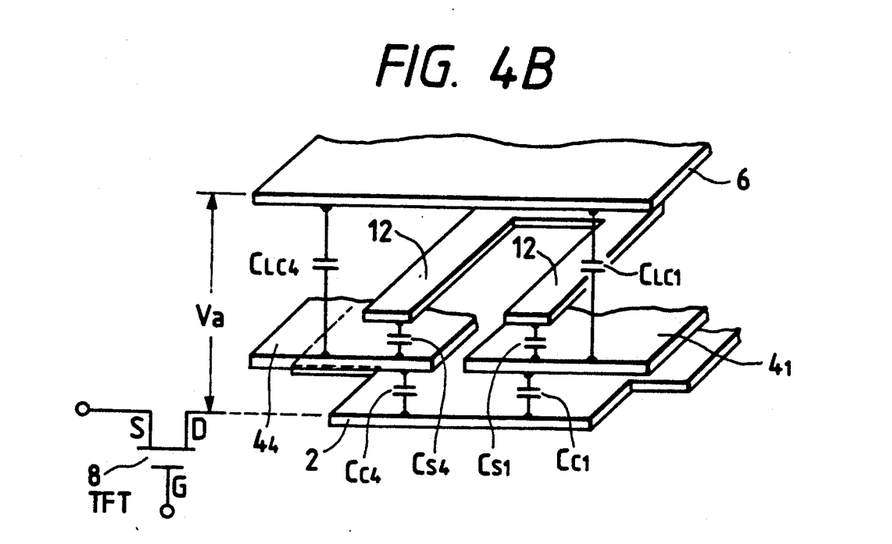
FIG. 4B is a diagram showing electrostatic capacitances formed between respective electrodes in FIG. 4A.

FIG. 4A illustrates one pixel region of the liquid crystal display device according to the present invention, in which the parts corresponding to those in FIG. 1A are identified by the same reference numerals and characters, and no detailed description will be given of them. According to the first aspect of the present invention, the control capacitor electrode 2 formed of ITO is provided as a wide, cross-shaped electrode extending the entire length of a cross-shaped gap Ga separating the subpixel electrodes and having its four corner portions removed over a predetermined area at each corner of a rectangular pixel region in this example. Consequently, the liquid crystal corresponding to the gap Ga between the subpixel electrodes is driven by the voltage that is applied to the control capacitor electrode 2. According to the second aspect of the invention, an additional capacitor using an insulating film 11 as a dielectric is formed between an additional capacitor electrode 12 and the subpixel electrode $4_i$ (where i=1 to 4) as shown in FIG. 4B. That is, in this example, the additional capacitor electrode 12 is formed in a U-letter shape on the subpixel electrodes $4_1$ to $4_4$ separated by the cross-shaped gap Ga and covered with the insulating film 11 as of silicon nitride ($SiN_x$). The U-shaped additional capacitor electrode 12 is formed so that it extends over the subpixel electrodes $4_1$ to $4_4$ one after another. Such additional capacitor electrodes 12 of respective pixels on each row are sequentially connected by wiring (not shown) and are given a fixed potential during an operation of the liquid crystal display element. The additional capacitor electrode 12 may be formed of either ITO or aluminum, for example. It must be understood that the first and second aspects of the invention are effective independently of each other; therefore, the first aspect is not limited by the additional capacitor electrode 12 and the second aspect is not limited by the gap Ga separating the subpixels.

Figure 5:
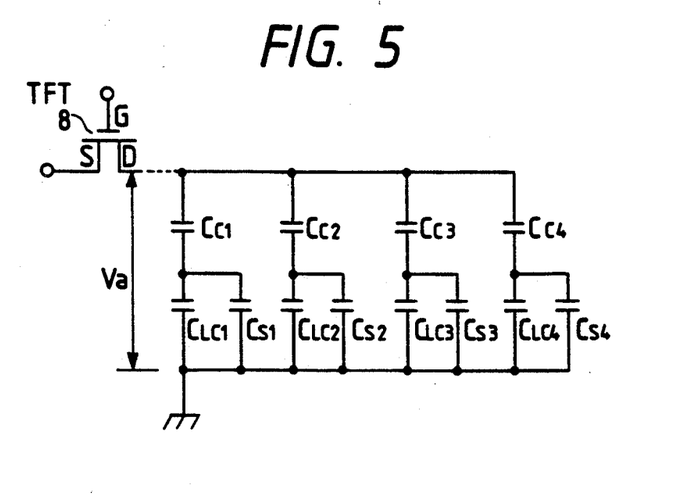
FIG. 5 is an electric equivalent circuit diagram of the pixel depicted in FIG. 4A.

FIG. 5 is an electric equivalent circuit of the pixel shown in FIG. 4A. Since the additional capacitor $C_{Si}$ is held at a fixed potential through wiring (not shown), it is equivalently connected in parallel to the liquid crystal capacitor $C_{LCi}$. The drive voltage Va which is applied across the control capacitor electrode 2 and the common electrode 6 is divided by the capacitance $C_{Ci}$ of the control capacitor and the composite capacitance $C_{LCi}+C_{Si}$ of the capacitance $C_{LCi}$ of the liquid crystal capacitor and the capacitance $C_{Si}$ of the additional capacitor, and the voltage $V_{LCi}$ which is applied to the liquid crystal capacitor $C_{LCi}$ is expressed as follows:

$$V_{LCi} = \frac{C_{Ci}}{C_{LCi} + C_{Si} + C_{Ci}} \cdot V_a \quad (6)$$

In the prior art example the voltage VLCi to be applied to the liquid crystal capacitor $C_{LCi}$ is set by only adjusting the capacitance $C_{Ci}$ of the control capacitor, but in the present invention the adjustment of the additional capacitance $C_{Si}$ is used in combination with the adjustment of the capacitance $C_{Ci}$. For example, in the case where the voltage $V_{LC4}$ across the capacitor $C_{LC4}$ is set to the smallest value among the voltages $V_{LC1}$ to $V_{LC4}$, the capacitance of the control capacitor $C_{C4}$ is set to a small value but the capacitance of the additional capacitor $C_{S4}$ is set to a large value, whereby the value of $C_{C4}/(C_{LC4}+C_{S4}+C_{C4})$ in Eq. (6) is set to a value smaller than in the case where i=1 to 3. With such a combined use of the control capacitor $C_{Ci}$ and the additional capacitor $C_{Si}$, the capacitance of the former need not be set to such a small value as in the prior art but a value which is not affected by an error in positioning the control capacitor $C_{Ci}$ during manufacture. It is desirable that even if the additional capacitor electrode 12 is formed out of position during manufacture, its area superposing each subpixel electrode $4_i$ does not appreciably change so as to suppress the scatter of its capacitance value.

Since the wide, cross-shaped control capacitor electrode 2 extends over the entire length of the gap Ga separating the subpixel electrodes $4_1$ to $4_4$, the voltage Va which is applied across the control capacitor electrode 2 and the common electrode 6 is divided by the insulating films 3, 11 and the liquid crystal 7 overlying the gap Ga, and the liquid crystal 7 is controlled to permit or inhibit the passage therethrough of light according to the magnitude of the voltage Va, thus contributing to the multi-gradation display as is the case with the subpixel electrodes. This increases the aperture ratio of the pixel.

Incidentally, the liquid crystal 7 in the region of the subpixel electrode $4_i$ wherein the capacitance of the control capacitor $C_{Ci}$ is larger than those in the other subpixel electrode regions is to be supplied with a voltage higher than those applied to the liquid crystal in the other regions. To maximize the voltage across a liquid crystal capacitor $C_{LCi}$ when the voltage Va is assumed to be fixed, the control capacitor electrode 2 needs only to extend all over the subpixel electrode $4_i$ or, alternatively, the subpixel electrode $4_i$ and the control capacitor electrode 2 may also be electrically connected. An embodiment described later on utilizes such an electrical connection of the latter case and this is equivalent to setting the capacitance of the control capacitor $C_{Ci}$ to infinity, in which case the amount of overlapping of the control capacitor electrode 2 and the subpixel electrode $4_i$ is arbitrary or may also be zero.

DESIGN OF VOLTAGE VS. TRANSMITTANCE CHARACTERISTIC

By controlling the voltage-transmittance characteristics of the subpixels $F_1$ to $F_4$ through use of the capacitances of the additional capacitors $C_{Si}$ and the control capacitors $C_{Ci}$, the degree of freedom in designing the transmittance characteristic of the entire pixel increases, making it possible to obtain various preferable characteristics.

Figure 6A:
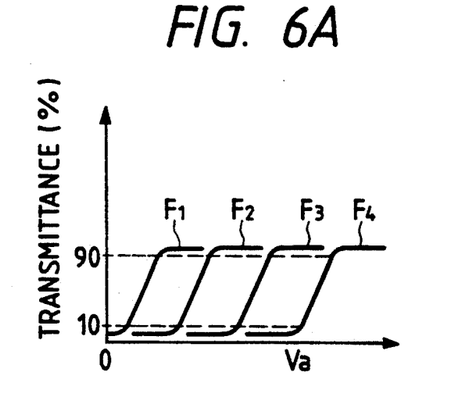
FIG. 6A is a graph showing an example of a voltage vs. transmittance characteristic of each subpixel in FIG. 4A.
Figure 6B:
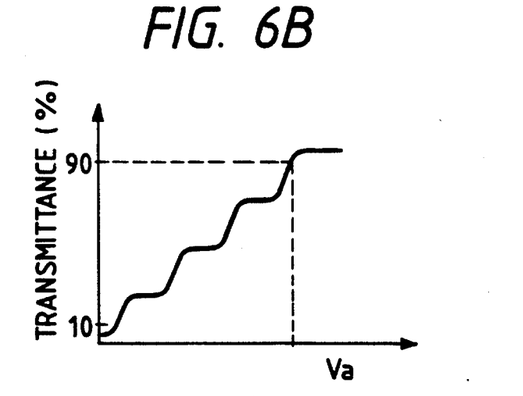
FIG. 6B is a graph showing an overall voltage vs. transmittance characteristic in the case of FIG. 6A.

(a) By setting the transmittance characteristics of the subpixels $F_1$ to $F_4$ to values spaced apart on the voltage axis as shown in FIG. 6A, the overall characteristic of the pixel can be made stepwise as depicted in FIG. 6B.

Figure 7A:
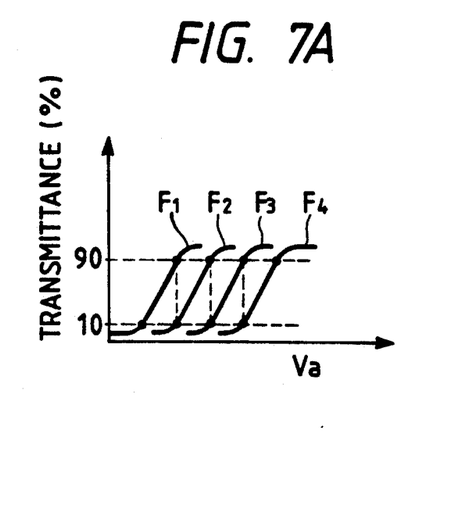
FIG. 7A is a graph showing another example of the voltage vs. transmittance characteristic of each subpixel in FIG. 4A.
Figure 7B:
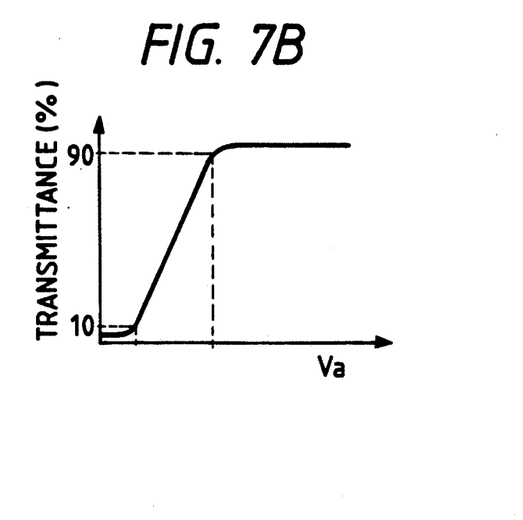
FIG. 7B is a graph showing an overall voltage vs. transmittance characteristic in the case of FIG. 7A.

(b) By setting the characteristics of the subpixels $F_1$ to $F_4$ so that the applied voltage Va when the transmittance of the subpixel $F_i$ is 90% and the applied voltage Va when the transmittance of the subpixel $F_{i+1}$ is 10% are equal to each other, the overall characteristic of the pixel becomes linear as shown in FIG. 7B and the slope of the characteristic curve can be made gentler than in the case where the pixel is not split into the subpixels. In this instance, the deviation of the transmittance of each subpixel $F_i$ from the straight line in FIG. 7A becomes a smaller compressed characteristic in the overall characteristic depicted in FIG. 7B, providing for improved linearity. Further, the linear region of the overall characteristic of the pixel also becomes wider than the individual characteristics in FIG. 7A. This eliminates the necessity of what is called gamma correction for adjusting the applied voltage value to correct the linearity when the liquid crystal display device is usually employed as a video signal display. Since the voltage-transmittance characteristic is gentle, it is possible to set a wide margin for the output deviation of a driving IC which supplies a signal to a source bus in the case of providing a video display or the like. By setting the voltage-transmittance characteristics of the individual subpixels as shown in FIG. 7A, the voltage at which the transmittance of the pixel becomes saturated can be made lower than in the case of FIG. 6B as can be seen from FIG. 7B; hence, the pixel can be driven at a lower voltage.

Figure 8A:
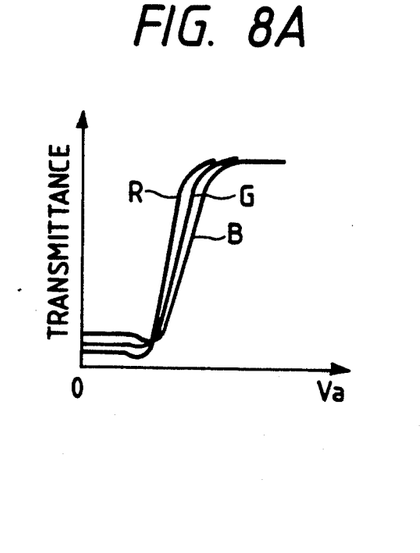
FIG. 8A is a graph showing general voltage vs. transmittance characteristics of red (R), green (G) and blue (B) pixels in a TN type color liquid crystal display element.
Figure 8B:
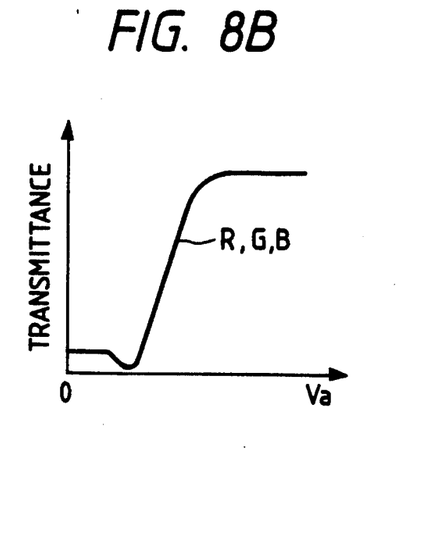
FIG. 8B is a graph showing, by way of example, voltage vs. transmittance characteristics of R, G and B pixels in the liquid crystal display device of the present invention.

(c) It is well-known as an essential feature of the TN type liquid crystal display device for color display use that the voltage-transmittance characteristic of the pixel differs with the R, G and B colors, based on the optically rotatory dispersion, as shown in FIG. 8A. According to the present invention, however, since the degree of freedom in designing the voltage-transmittance characteristic of the pixel increases, the characteristic can easily be designed as desired, and consequently, the voltage-transmittance characteristics for the three colors can be corrected to substantially the same characteristic. Even in the case where the pixel is not divided into subpixels, the voltage of the liquid crystal capacitor, $V_{LC} = V_a C_C/(C_{LC} + C_S + C_C)$, can be adjusted, for each color, by the capacitance of the control capacitor $C_C$ and the additional capacitance $C_S$, and the above-said correction can be made.

While in the above the pixel has been described as split into four subpixels, it is evident that it can be divided into n (an integer equal to or greater than 2) subpixels.

Figure 9A:
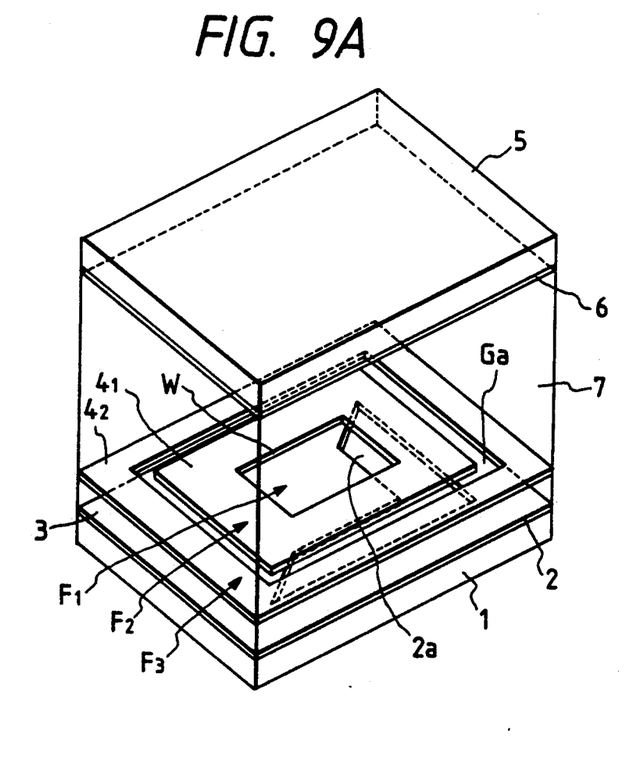
FIG. 9A is a perspective view illustrating an embodiment of the pixel structure according to the third aspect of the present invention.
Figure 9B:
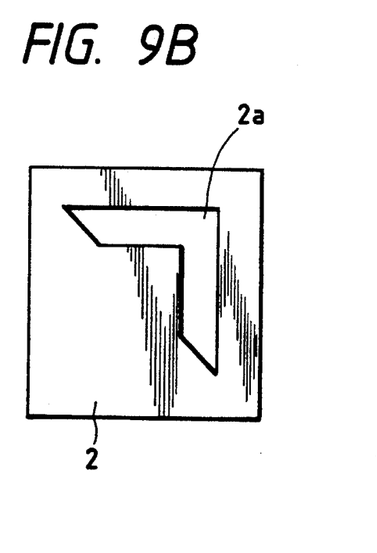
FIG. 9B is a plan view of a control capacitor electrode in FIG. 9A.

According to the third aspect of the present invention, the regions of the plurality of subpixels for each pixel are disposed concentrically For instance, as shown in FIG. 9A in which the parts corresponding to those in FIG. 4A are indicated by the same reference numerals, the pixel electrode of ITO is concentrically divided by a square loop-like gap Ga into two square loop-like subpixel electrodes $4_1$ and $4_2$ defining subpixels $F_2$ and $F_3$, respectively, where the latter is greater in area than the former. The subpixel electrode $4_1$ has a centrally-disposed square window W. As depicted in FIG. 9B, the control capacitor electrode 2 has an aperture 2a corresponding to about a half of the region of the subpixel electrode $4_1$ and is formed of ITO almost all over the pixel area in opposing relation to the subpixel electrodes $4_1$ and $4_2$ and the square window W except the aperture 2a, the control capacitor electrode 2 being covered with the insulating film 3. In this example the region of the control capacitor electrode 2 which is electrically exposed in the central window W through the insulating film 3 defines the subpixel region $F_1$. Accordingly, as the drive voltage Va applied across the control capacitor electrode 2 and the common electrode 6 is increased, the subpixel region $F_1$ in the central window W is turned ON first, then the subpixel region $F_2$ defined by the subpixel electrode $4_1$ is additionally turned ON, and finally the subpixel region $F_3$ defined by the subpixel electrode $4_2$ is additionally turned ON. It was ascertained experimentally that since the center of the ON region stays substantially at the center of the pixel irrespective of whether the ON region increases or decreases as mentioned above, the liquid crystal display device with pixels of such a construction provides an image easy to see and is more excellent in the display image quality than in the case where the pixel electrode is divided into the row and column directions as shown in FIG. 1.

OTHER EMBODIMENTS

Figure 10A:
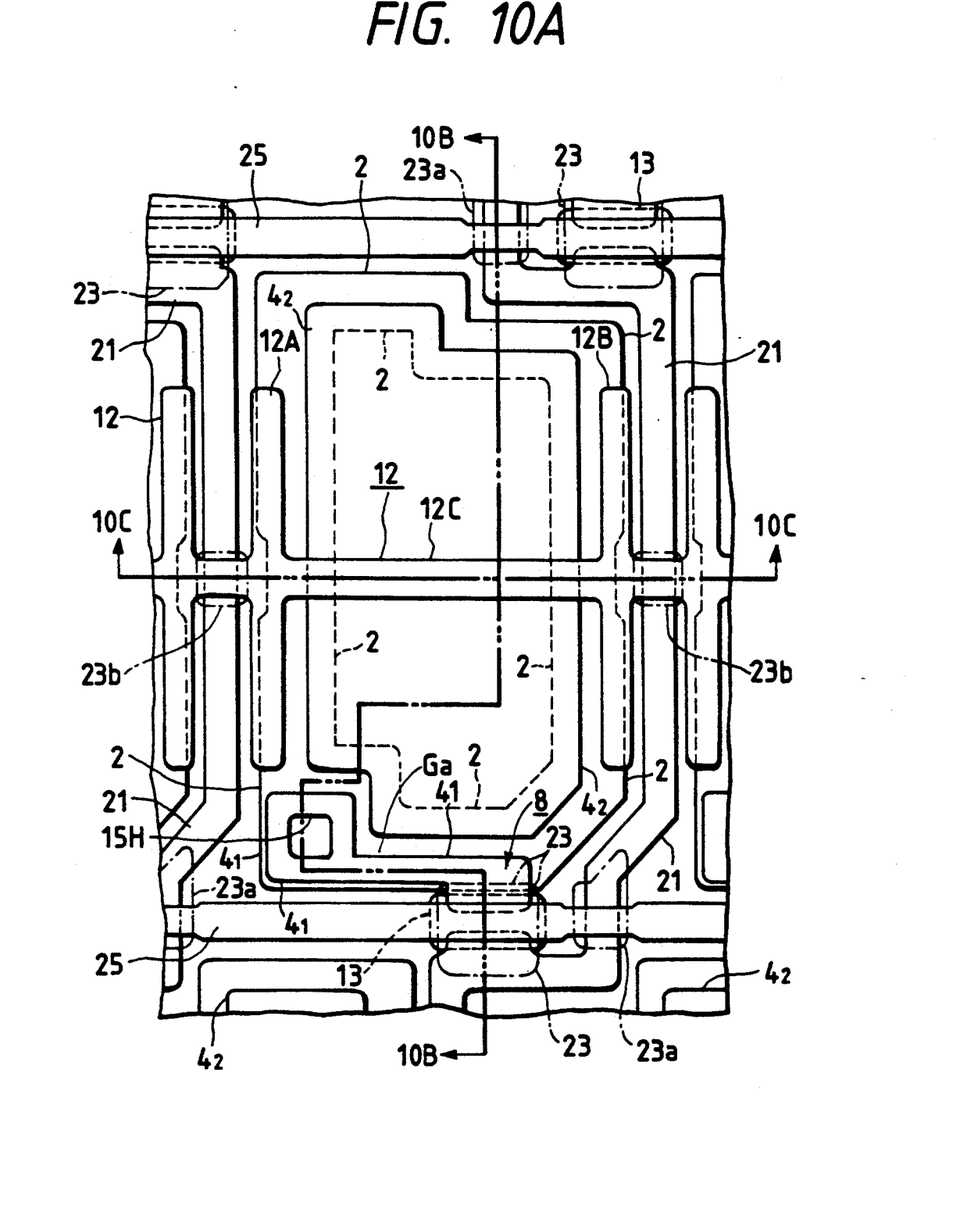
FIG. 10A is a plan view illustrating the principal part of another embodiment of the present invention.
Figure 10B:
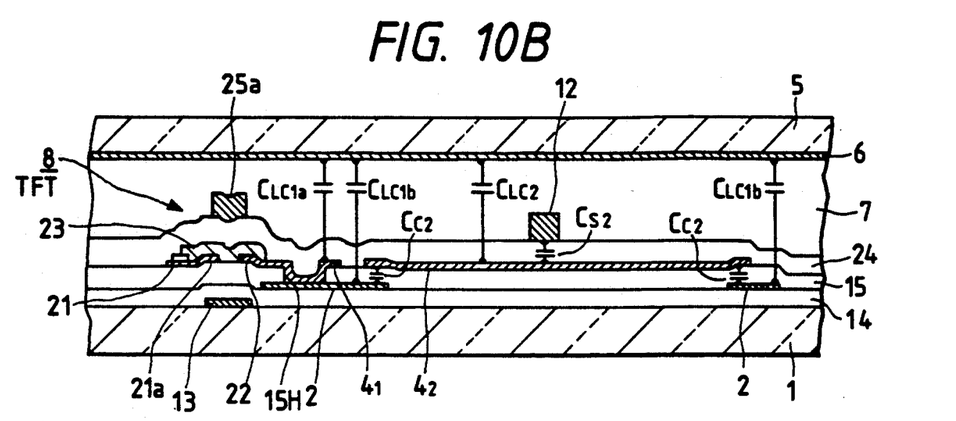
FIG. 10B is a sectional view taken on the line 10B—10B in FIG. 10A.
Figure 10C:
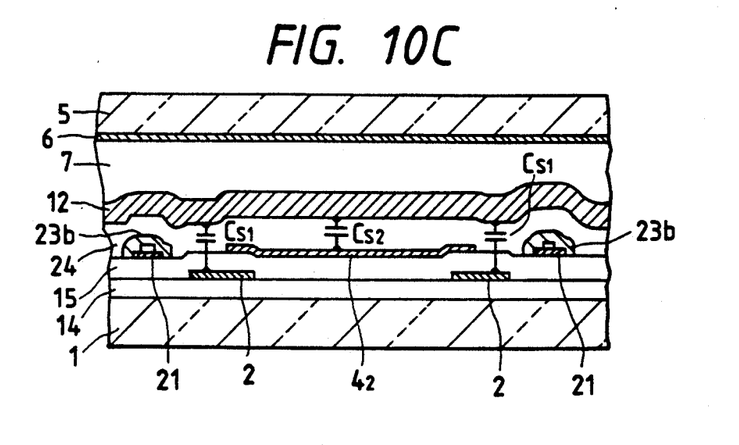
FIG. 10C is a sectional view taken on the line 10C—10C in FIG. 10A.

FIG. 10A is a plan view illustrating an embodiment wherein each pixel is comprised of two subpixels and a first pixel electrode is connected to the control capacitor electrode according to a combination of the first and second aspects of the present invention. FIGS. 10B and 10C are sectional views taken on the lines 10B—10B and 10C—10C in FIG. 10A, respectively In FIG. 10 the parts corresponding to those in FIG. 4 are indicated by the same reference numerals and characters. On the transparent base plate 1 there are provided island-like light intercepting layers 13 for preventing the incidence of light to the TFT's. The transparent base plate 1 and the light intercepting layers 13 are covered with an insulating film 14 as of silicon oxide ($SiO_2$), on which the loop-shaped control capacitor electrode 2 is formed of ITO or the like. The control capacitor electrode 2 and the insulating film 14 are covered with an insulating film 15 as of silicon oxide, on which a source bus 21, a source electrode 21a, a drain electrode 22 and the subpixel electrodes $4_1$ and $4_2$ are formed of ITO or the like. The subpixel electrode $4_1$ is formed in contact with the control capacitor electrode 2 in a contact hole 15H made in the insulating film 15 on the control capacitor electrode 2 and electrodes $4_1$ and 2 are held conductive to each other. The subpixel electrode $4_1$ is extended to the drain electrode 22 of the TFT 8 and connected thereto. A semiconductor layer 23 as of amorphous silicon is formed which extends between the source electrode 21a and the drain electrode 22. The semiconductor layer 23 and the subpixel electrodes $4_1$ and $4_2$ are covered with a gate insulating film 24 as of silicon nitride ($SiN_x$), on which a gate bus 25, a gate electrode 25a and the additional capacitor electrode 12 are simultaneously formed of aluminum, for example.

The transparent base plate 1, which has the TFT's 8, the subpixel electrodes $4_1$ and $4_2$, etc. formed on the inside thereof as described above is disposed opposite the transparent base plate 5 with the common electrode 6 formed on the inside thereof and the liquid crystal 7 is sealed in the space defined by the base plates 1 and 5 therebetween.

In the intersecting portions of the source bus 21 with the gate bus 25 and the additional capacitor electrode 12, island-shaped semiconductor layers 23a and 23b are laminated under the gate insulating film 24 to ensure the isolation of the source bus 21 from the gate bus 25 and the additional capacitor electrode 12. The TFT 8 is provided near the intersection of the gate bus 25 and the source bus 21. The subpixel electrode $4_1$ of a small area and the subpixel electrode $4_2$ of a large area are formed in a region defined by such right and left source buses 21 and such top and bottom gate buses 25. The control capacitor electrode 2 is formed in the shape of a loop which surrounds and overlaps the marginal portion of the subpixel electrode $4_2$. The subpixel electrode $4_1$ and the control capacitor electrode 2 are electrically interconnected in the contact hole 15H as referred to previously.

The control capacitor electrode 2 connected to the subpixel electrode $4_1$ is disposed around the subpixel electrode $4_2$ concentrically therewith, and consequently, when the voltage Va is applied to the pixel via the TFT 8 during the driving of the liquid crystal display device, the region of the control capacitor electrode 2 surrounding the subpixel electrode $4_2$ (including the subpixel $4_1$ as well), is turned ON (transparent) first, and when the voltage Va is raised higher by a predetermined value, the region of the subpixel electrode $4_2$ is also turned ON. With such concentric control of the display region of the pixel as mentioned above, the display quality is higher than in the case where the subpixels are arranged lengthwise and/or widthwise as shown in FIG. 4A.

The additional capacitor electrode 12 is formed on the subpixel electrode $4_2$ through the gate insulating film 24. In this embodiment the additional capacitor electrode 12 has an H-letter shape, whose horizontal portion 12C horizontally extends across the control capacitor electrode 2 substantially centrally thereof and has at its both ends vertical portions 12A and 12B. The vertical portions 12A and 12B extend overlapping the marginal portions of the control capacitor electrode 2. The horizontal portion 12C has its both ends extended and connected to the additional capacitor electrodes 12 of the adjoining pixels in the direction of extension of the gate bus 25. During the operation of the liquid crystal display device these additional capacitor electrodes 12 of all the pixels are held at a predetermined potential by applying a fixed DC voltage to the extended ends of the horizontal portions 12C. The control capacitor electrode 2 is disposed overlapping the gap Ga between the subpixel electrodes $4_1$ and $4_2$.

Figure 11:
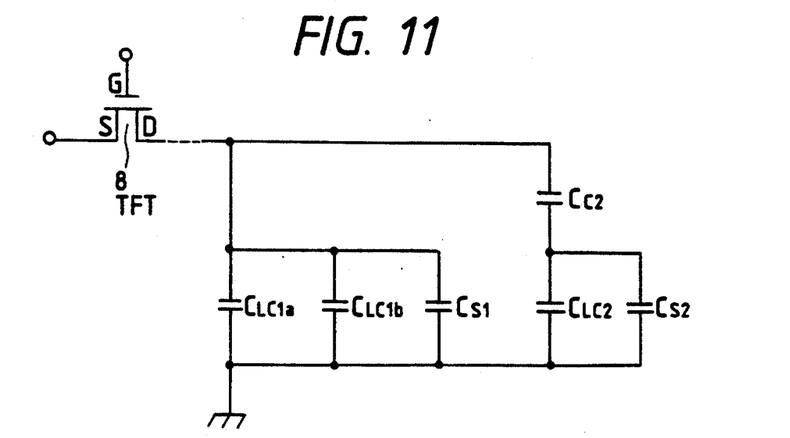
FIG. 11 is an electric equivalent circuit of each pixel in the embodiment of FIGS. 10A, 10B and 10C.

The control capacitor $C_{C2}$ is formed between the control capacitor electrode 2 and the subpixel electrode $4_2$, but since the control capacitor electrode 2 and the subpixel electrode $4_1$ are electrically interconnected, the control capacitor $C_{C1}$ is not formed. (Alternately, it can be considered that the capacitor $C_{C1}$ is formed but shorted thereacross.) The additional capacitance $C_{S2}$ is formed between the additional capacitor electrode 12 and the subpixel electrode $4_2$. In this example the additional capacitance $C_{S1}$ is not directly formed between the subpixel electrode $4_1$ and the additional capacitor electrode 12, but instead it is formed between the control capacitor electrode 2 (connected to the subpixel electrode $4_1$) and the additional capacitor electrode 12. Liquid crystal capacitors $C_{LC1a}$, $C_{LC1b}$ and $C_{LC2}$ are formed between the subpixel electrode $4_1$ and the common electrode 6, between the control capacitor electrode 2 opposite the gap Ga and the common electrode 6, and between the subpixel electrode $4_2$ and the common electrode 6, respectively. Accordingly, the electric equivalent circuit of the pixel in the embodiment of FIGS. 10A, 10B and 10C is as shown in FIG. 11.

In the embodiment of FIGS. 10A, 10B and 10C the overlap of the control capacitor electrode 2 with the marginal portion of the subpixel electrode $4_2$ is about 12 μm, but in the prior art example which does not employ the additional capacitance, the above-noted overlap is required to be as small as, for example, 1.5 μm, and consequently, no sufficient margin for a patterning error can be provided.

As will be seen from FIG. 10A, the additional capacitor electrode 12 overlaps both marginal edges of the control capacitor electrode 2 at the center of each of the vertical portions 12A and 12B widthwise thereof; hence, the partial areas of the additional capacitor electrode 12 overlapping the subpixel electrode $4_2$ and the control capacitor electrode 2 (connected to the subpixel electrode $4_1$) remain substantially unchanged regardless of a positioning error of the additional capacitor electrode 12. Accordingly, the capacitances of the additional capacitors $C_{S1}$ and $C_{S2}$ are held substantially constant irrespective of a positioning error. Incidentally, the additional capacitors $C_{S1}$ and $C_{S2}$ function as storage capacitances for holding signal charges and contribute to the stabilization of a display under high temperature conditions in which a leakage current increases.

Figure 12:
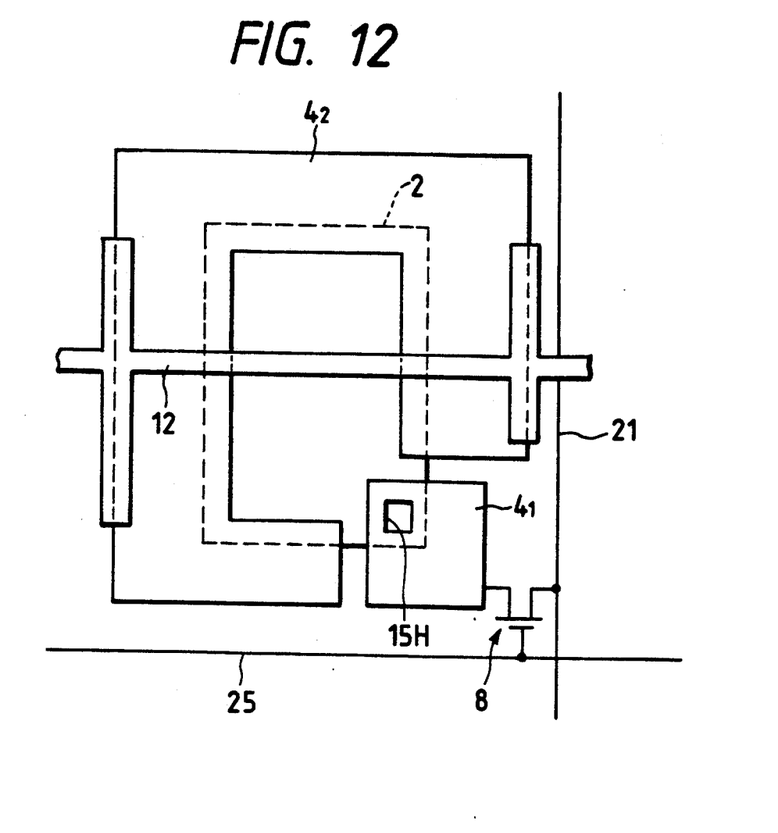
FIG. 12 is a plan view schematically illustrating a modified form of the embodiment of FIGS. 10A, 10B and 10C.

Although in FIGS. 10A, 10B and 10C the control capacitor electrode 2 is formed around the subpixel electrode $4_2$, it is also possible to employ an arrangement in which the control capacitor electrode 2 is disposed at the center of the pixel region and subpixel electrode $4_2$ is formed around the electrode 2, overlapping its marginal portion, as schematically shown in FIG. 12. In this case, as the applied voltage Va is increased, the central subpixel region is turned ON first and then the outer subpixel region is also turned ON.

Figure 13:
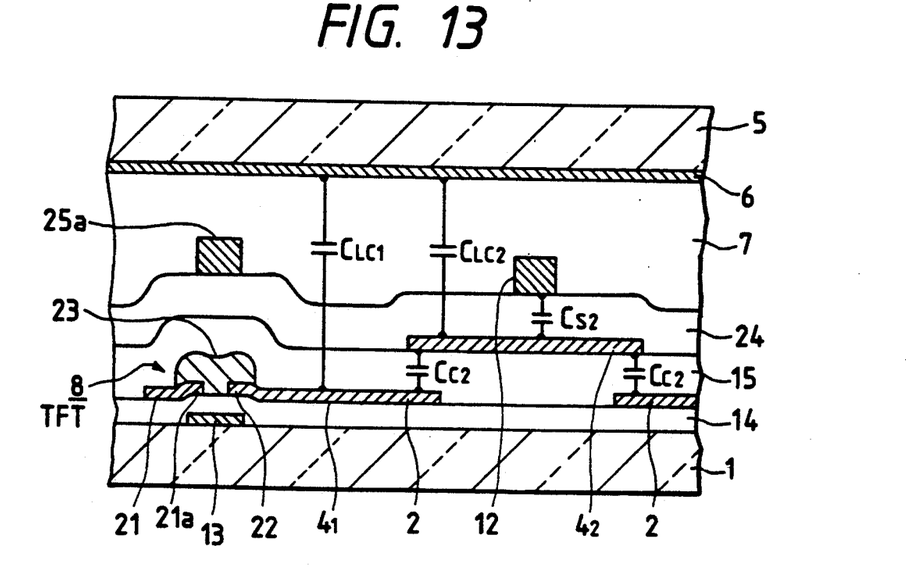
FIG. 13 is a sectional view showing a modification of the embodiment of FIGS. 10A, 10B and 10C.

Moreover, it is possible to employ such a structure as shown in FIG. 13, wherein the source electrode 21a and the drain electrode 22 of the TFT 8 in the embodiment of FIGS. 10A, 10B and 10C are formed in the same layer as the control capacitor electrode 2 so that the subpixel electrode $4_1$ and the control capacitor electrode 2 are formed as a unitary structure with each other.

Figure 14A:
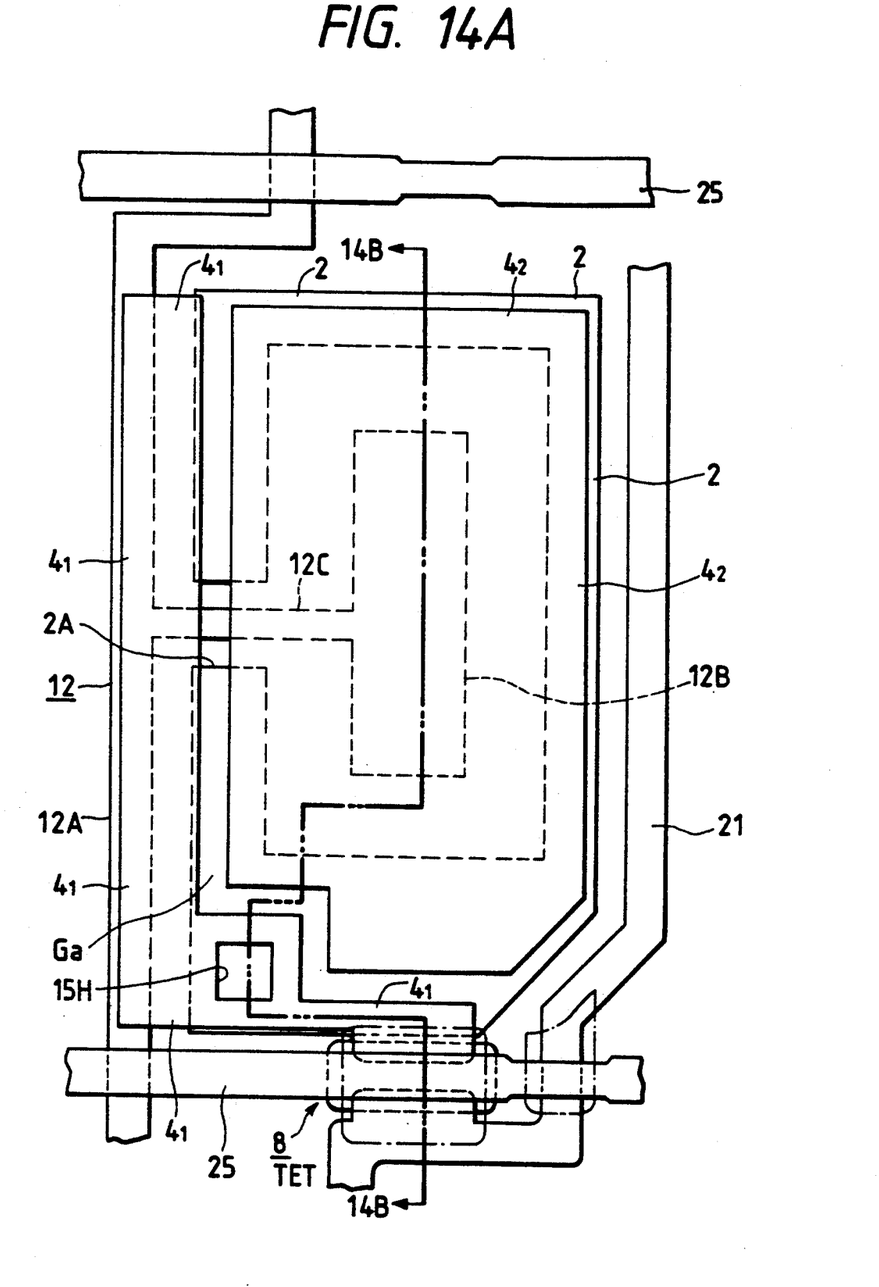
FIG. 14A is a plan view illustrating another embodiment of the present invention.
Figure 14B:
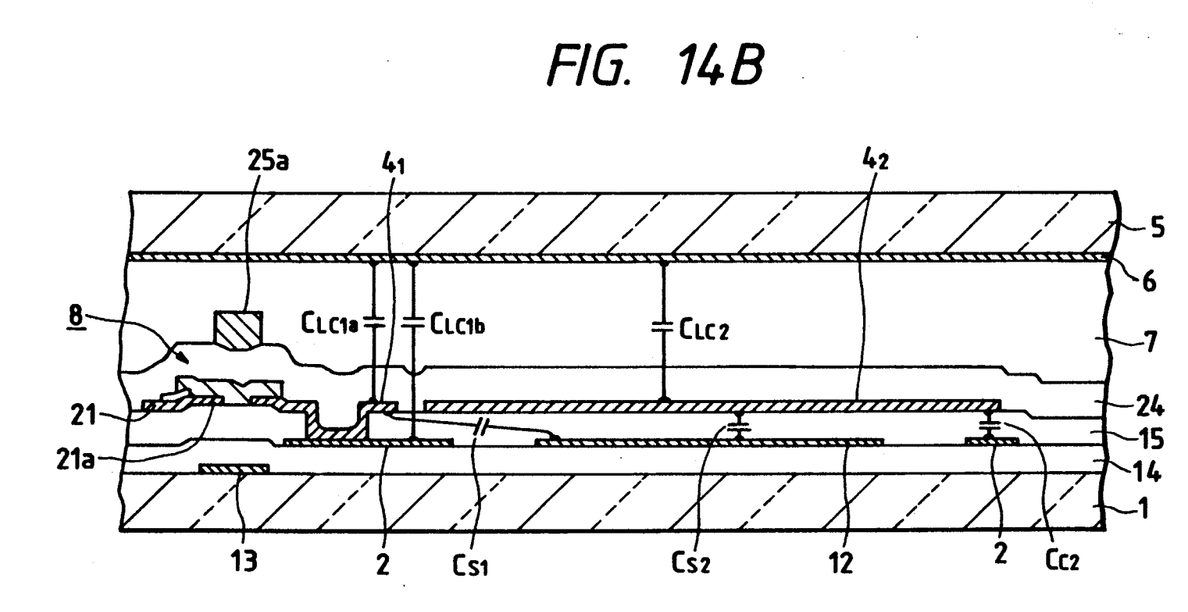
FIG. 14B is a sectional view taken on the line 14B—14B in FIG. 14A.

While in embodiment of FIGS. 10A, 10B and 10C the additional capacitor electrode 12 is disposed above the subpixel electrode $4_2$, it may also be formed in the same plane as the control capacitor electrode 2 beneath the subpixel electrodes $4_1$ and $4_2$, as shown in FIGS. 14A and 14B. That is, in the embodiment of FIGS. 14A and 14B the square loop-shaped control capacitor electrode 2 is partly removed to form a path 2A, through which the horizontal portion 12C of the modified H-shaped additional capacitor electrode 12 is passed, and the vertical portions 12A and 12B of the H-shaped electrode 12 are disposed outside and inside of the square loop-shaped electrode 2, respectively. Furthermore, in this embodiment the subpixel electrode $4_1$ is formed so that its two marginal edges cover the marginal edge of the control capacitor electrode 2 and the additional capacitor electrode 12 and extend along substantially the entire lengths of both longer sides of the substantially rectangular subpixel electrode $4_2$ in parallel thereto, with the gap Ga defined between them. The vertical portion 12A of the H-shaped additional capacitor electrode 12 has its two ends extended and connected to the vertical portions 12A of the additional capacitor electrodes of the upper and lower adjoining pixels, and during the operation of the liquid crystal device the additional capacitor electrodes 12 are held at a fixed potential. The equivalent circuit of this embodiment is also exactly the same as shown in FIG. 11.

Figure 15A:
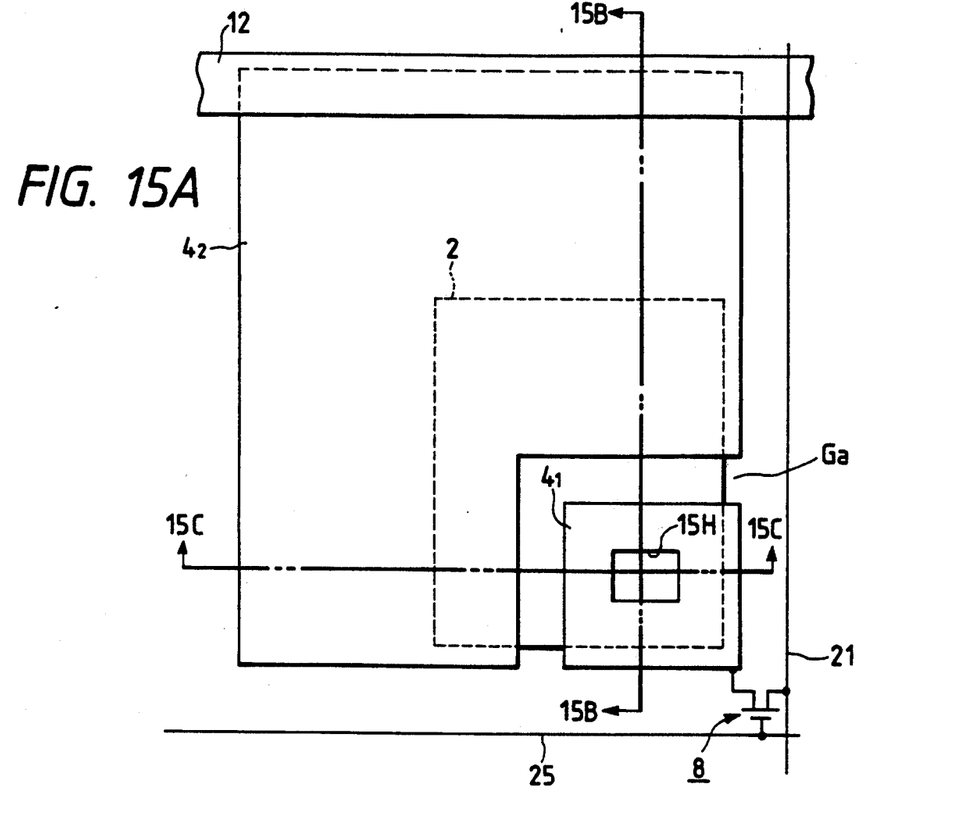
FIG. 15A is a plan view illustrating still another embodiment of the present invention.
Figure 15B:
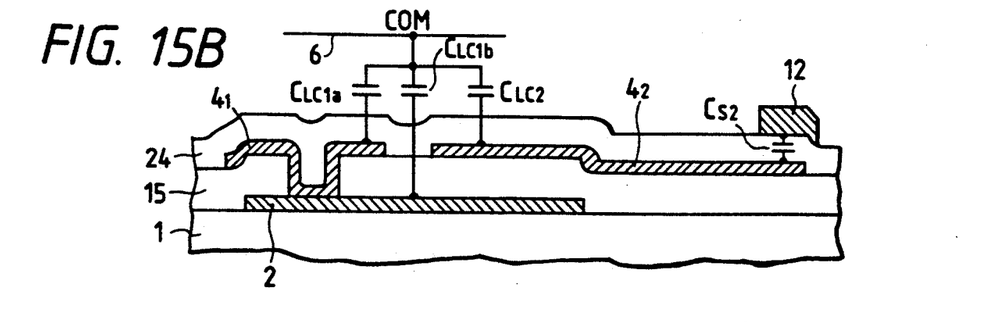
FIG. 15B is a sectional view taken on the line 15B—15B in FIG. 15A.
Figure 15C:
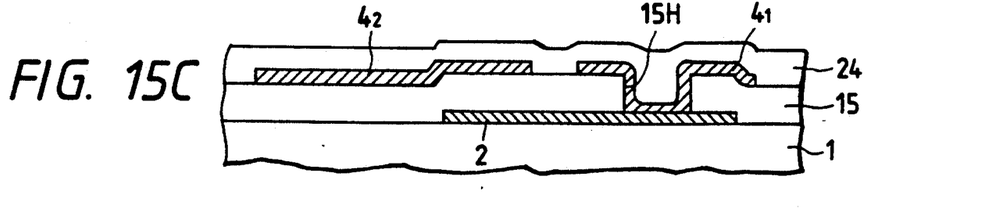
FIG. 15C is a sectional view taken on the line 15C—15C in FIG. 15A.

While in the above embodiments the additional capacitors $C_{S1}$, $C_{S2}$, . . . are provided in association with all of the subpixel electrodes $4_1$, $4_2$, . . . such an additional capacitor need not always be connected to at least one of the subpixel electrodes in some cases. FIGS. 15A, 15B and 15C schematically illustrate a structure in which the additional capacitor $C_{S1}$ in the embodiment shown in FIGS. 10a, 10B and 10C is omitted. In this embodiment the additional capacitor electrode 12 and the gate bus 25 are simultaneously formed of the same material (aluminum, for example) in parallel to each other so that the additional capacitor electrode 12 overlaps one marginal portion of the rectangular subpixel electrode $4_2$ through the gate insulating film 24. The subpixel electrode $4_1$ is connected to the control capacitor electrode 2 through the contact hole 15H made in the insulating film 15 as in embodiment of FIGS. 10A, 10B and 10C. The control capacitor electrode 2 does not overlap the additional capacitor electrode 12, and consequently, no additional capacitor is connected to the subpixel electrode $4_1$ in this embodiment. The electric equivalent circuit of the pixel in this embodiment is identical with the circuit of FIG. 11 except that the additional capacitor $C_{S1}$ is removed.

Figures 16A, 16B:
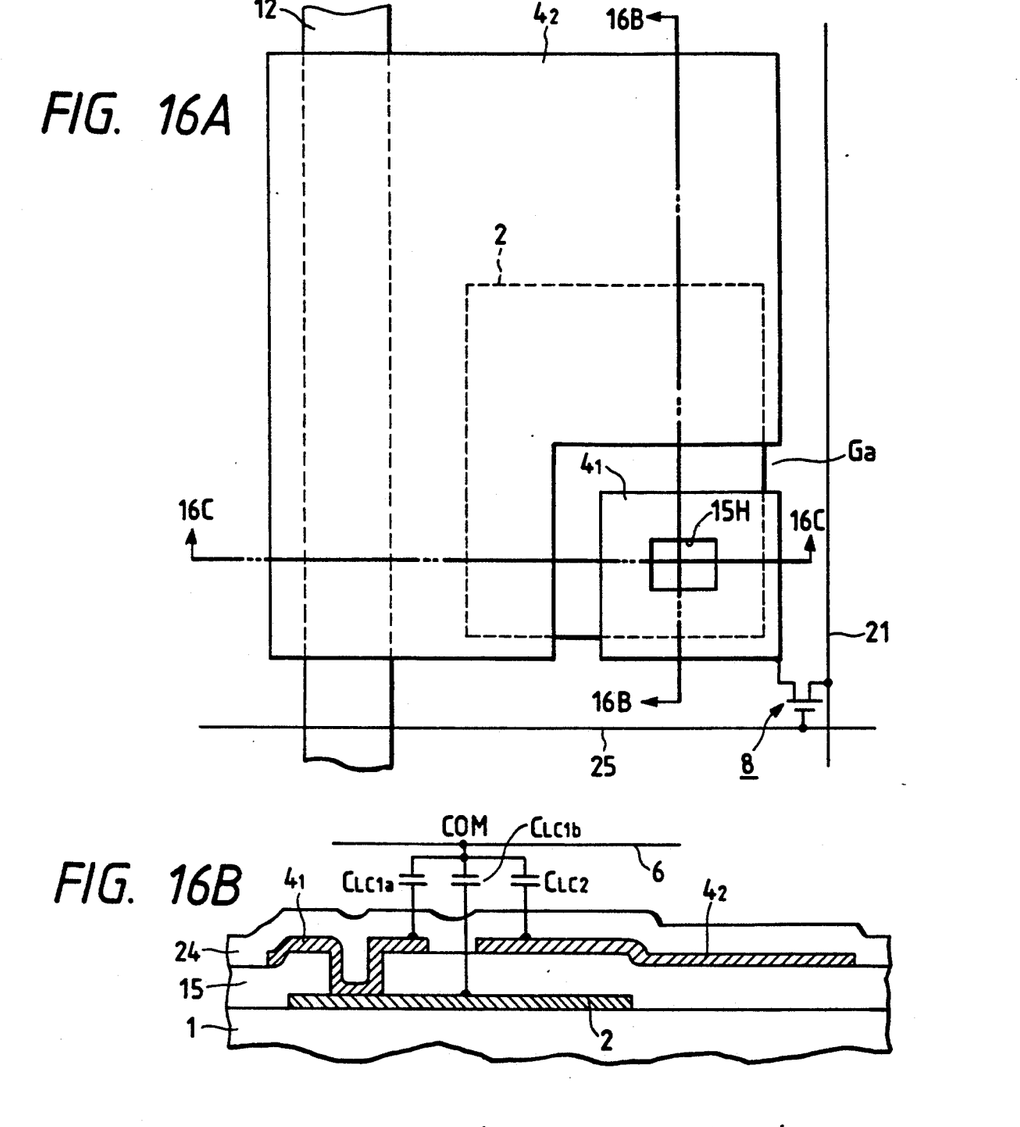
FIG. 16A is a plan view illustrating a further embodiment of the present invention.
FIG. 16B is a sectional view taken on the line 16B—16B in FIG. 16A.
Figure 16C:
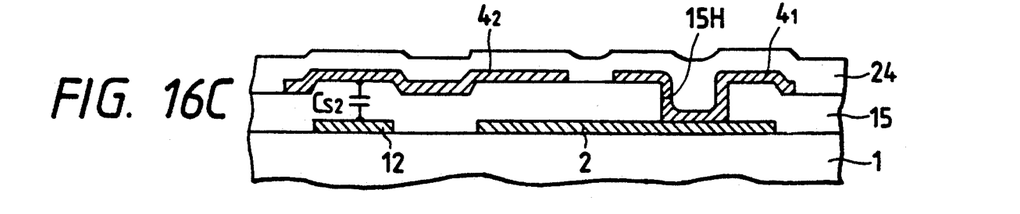
FIG. 16C is a sectional view taken on the line 16C—16C in FIG. 16A.

FIGS. 16A, 16B and 16C illustrate a structure in which the additional capacitor $C_{S1}$ in the embodiment of FIGS. 14A, 14B and 14C is similarly omitted. In this embodiment the additional capacitor electrode 12 is formed of ITO in the same plane as the control capacitor and at the same time therewith and is extended in the same direction as the source bus 1 so that it overlaps the subpixel electrode $4_2$. The subpixel electrode $4_1$ is connected to the control capacitor electrode 2 through the contact hole 15H made in the insulating film 15 but does not overlap the additional capacitor electrode 12. Accordingly, no additional capacitor is connected to the subpixel electrode $4_1$, and the electric equivalent circuit of the pixel in this embodiment is identical with the circuit of FIG. 11 except that the additional capacitor $C_{S1}$ is removed.

As described above, the effect of the additional capacitor based on the principles according to the second aspect of the present invention is to increase the degree of freedom in designing the control capacitor relative to the subpixel electrode to which the additional capacitor is connected. Accordingly, as will be seen from the embodiments depicted in FIGS. 15A to 15C and 16A to 16C, the principles of the invention cannot be applied to the subpixel electrode to which the control capacitor electrode is not connected in series, so that no additional capacitor is not provided in association with such a subpixel electrode. With the connection of the additional capacitor, however, the capacitance of the liquid crystal capacitor increases, and hence the amount of charge it can store increases accordingly, producing an effect of retarding a voltage drop by an increase of a leakage current under high temperature conditions as is well-known in the art.

As described above, according to the first aspect of the present invention, the control capacitor electrode 2 is provided overlapping the gap Ga separating the subpixel electrodes $4_i$ and a drive voltage is applied via the control capacitor electrode 2 across the liquid crystal corresponding to the gap Ga. Since the control capacitor electrode 2 can be used as one subpixel electrode, aperture ratio of the pixel can be increased correspondingly.

According to the second aspect of the present invention, in at least one of the plurality of subpixels, $F_i$, the additional capacitor $C_{Si}$ is used together with the conventional control capacitor $C_{Ci}$, for determining the voltage $V_{LCi}$ across the liquid crystal capacitor $C_{LCi}$, and the degree of freedom in designing the voltage-transmittance characteristic of the subpixel increases correspondingly. On this account, the area of the control capacitor electrode 2 overlapping the subpixel electrode $4_i$ need not be made so small that the influence of a capacitance error by a pattern positioning error would pose a problem. Hence, each liquid crystal voltage $L_{LCi}$ can be set with a higher degree of accuracy than in the past. Consequently, the multi-gradation display by the pixel can be produced more accurately than in the past and the display quality can be enhanced accordingly. Since the voltage-transmittance characteristic of each subpixel can be set with high precision by the combined use of the control capacitor and the additional capacitor, the linearity of the overall voltage-transmittance characteristic of the pixel can easily be increased and the so-called gamma correction needed in the past for correcting the linearity is not necessary. For the same reason, it is possible to easily correct deviations of the voltage-transmittance characteristics of pixels of different colors which are caused by an optically rotatory dispersion in the TN type liquid crystal color display device.

According to the third aspect of the present invention, since each pixel has a construction in which a plurality of subpixels are disposed concentrically, the display image quality can be increased.

It will be apparent that many modifications and variations may be effected without departing from the scope of the novel concepts of the present invention.

What is claimed is:

1. A liquid crystal display device comprising at least one subpixel electrode occupying a part of a region defined by a pixel, said subpixel electrode being disposed on an insulating film on a first base plate in opposing relation to a common electrode on a second base plate across liquid crystal, a control capacitor electrode partly opposite said at least one subpixel electrode being provided through said insulating film to form a control capacitor connected in series with a liquid crystal capacitor formed between said at least one subpixel electrode and said common electrode, means for applying a drive voltage across said control capacitor electrode and said common electrode, and an additional capacitor electrode formed in the same plane as said control capacitor electrode in opposing relation to said at least one subpixel electrode through said insulating film to form an additional capacitor equivalently in parallel to said liquid crystal capacitor.

* * * * *